Jan. 6, 1970   L. McGANN   3,488,485

AREA LIGHT SOURCE

Filed Aug. 19, 1966

INVENTOR.
LAURENCE McGANN
BY Leonard Holtz
AGENT

United States Patent Office 3,488,485
Patented Jan. 6, 1970

3,488,485
AREA LIGHT SOURCE
Laurence McGann, Woodland Hills, Calif., assignor to International Telephone and Telegraph Corporation, Nutley, N.J., a corporation of Maryland
Filed Aug. 19, 1966, Ser. No. 573,550
Int. Cl. F21k 7/00
U.S. Cl. 240—1
3 Claims

ABSTRACT OF THE DISCLOSURE

An area light source comprises a medium which is pervious to light. At least one light source and a plurality of reflecting particles are embedded in the medium. The particles increase the diffusion properties of the light emitted by an illuminating device. A source of electrical energy is coupled to the illuminating device. A portion of one or more surfaces of the light pervious medium is coated with a light reflecting material. The energy source may be either a power supply for providing a constant input signal to the illuminating means or a modulated electrical energy source for providing a time varying input. The area light source provides a high light intensity of good uniformity, high frequency response and high modulation percentage.

---

This invention relates to area light sources, and more particularly to area light sources wherein illuminating means comprising at least one light source and a plurality of light reflecting particles are embedded in a medium pervious to light.

Prior art area light sources utilize lamps having large filaments and a high power dissipation in order to obtain adequate light intensity. One disadvantage of such a system is the nonuniformity of the resulting light. Also, in order to obtain a higher intensity at the viewing surface, the prior art sources utilized a reflective coating on the nonviewing surface of the light source. The abovementioned prior art light sources have a high thermal inertia due to the high power dissipation in the large filaments which severely limits the frequency response thereof when used in a light modulated system. In order to increase the frequency response, lower intensity lamps were used which thereby decreased the thermal inertia of the source. This consequently lowered the intensity of the available light and the modulation percentage.

Therefore, the main object of this invention is to provide a highly reliable area light source having a high light intensity of good uniformity, a high frequency response and a high modulation percentage.

An area light source according to this invention comprises a medium which is pervious to light in which is embedded illuminating means comprising at least one light source and a plurality of reflecting particles, said particles increasing the diffusion properties of the light emitted by said illuminating means. Further provided is means for applying electrical energy to said illuminating means and means for coating at least a portion of one or more surfaces of said light pervious medium with a light reflecting material.

Other objects of this invention will be apparent upon reference to the following description taken in conjunction with the accompanying drawings, in which.

Figure 1:
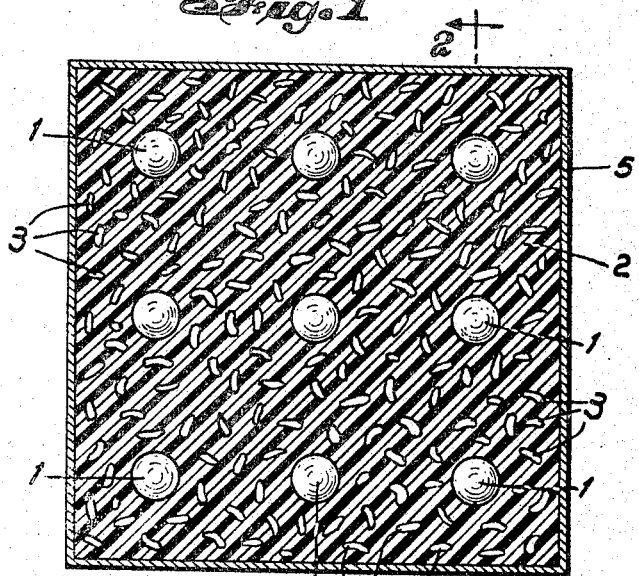
FIGURE 1 is an illustration of a light source according to this invention.
Figure 2:
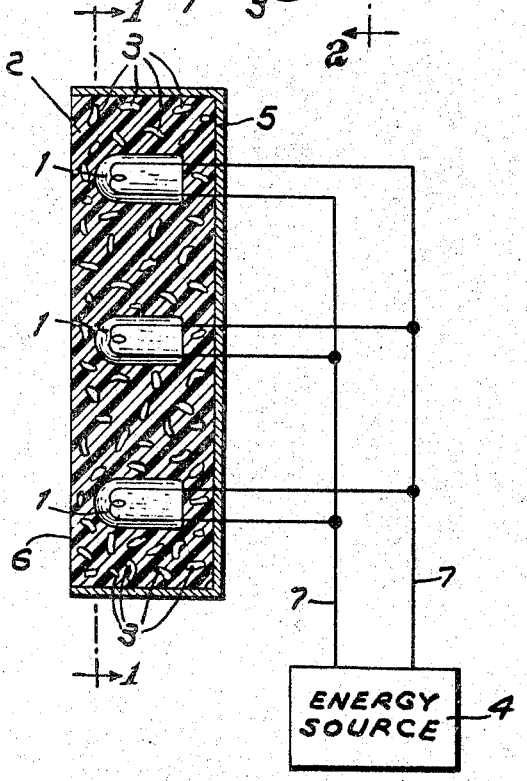
FIGURE 2 is another view of the light source of FIGURE 1.

Referring to FIGURES 1 and 2, nine small light bulbs 1 are arranged in a 3 x 3 matrix and are embedded in a light pervious medium 2. In this embodiment medium 2 comprises a block of light pervious material which is preferably translucent. The bulbs 1 are electrically connected in parallel to energy source 4 via leads 7. It is obvious that other physical arrangements of as many bulbs as is desired including the situation where only one bulb is used may be utilized within the scope of this invention. In order to improve the uniformity of the light throughout the medium 2, a plurality of light reflecting particles 3 are embedded therein. This gives better diffusion properties to the light source. To obtain a higher light intensity at the viewing surface (surface 6, FIGURE 2, for example) of said source all of the nonviewing surfaces of said block are coated with a light reflecting material 5 (i.e., an aluminized coating). It is clear that the particular application in which the light source issued will determine how many surfaces or what portions of the surfaces should be coated with the reflective material 5.

The small lamps 1 have a very low heat capacity and thermal inertia and therefore the light intensity thereof is capable of following an audio frequency modulation of up to 400 cycles per second and better with a high modulation percentage. Since a plurality of lamps 1 are used, a high light intensity is attained. Further, the multiplicity of lamps insures a high degree of reliability. Therefore, what results is a highly reliable light source having a high light intensity of good uniformity and having good modulation properties.

The energy source 4 (see FIGURE 2) may be either a power supply for providing a constant input signal to said lamps or a modulated electrical energy source for providing a time varying input to said lamps. Both of these energy sources are well known in the art. When a modulated signal is used, the light output from the area light source will vary in accordance with the variations in the input signal, provided that the variations in said input signal are within the frequency capability of the lamps. This enables the instant source to be used in light modulated signalling and communication systems.

Light sources according to this invention may also be used in various optical instruments and in photographic enlargers where the uniformity of light over a given area is a desirable feature. It is recognized that there are many other applications where a light source having the features fo the source described in this disclosure is desirable, and it is not intended to limit the use of the instant light source to the typical applications described herein.

It is also not intended to limit this invention to use only with small lamps. It is recognized that other light sources may be utilized in place thereof within the spirit of this invention.

While I have described above the principles of my invention in connection with specific apparatus, it is to be clearly understood that this description is made only by way of example and not as a limitation to the scope of my invention, as set forth in the appended claims.

I claim:
1. An area light source comprising:
   a medium pervious to light formed of a block of light pervious material;
   iluminating means having a low thermal inertia comprising a plurality of light sources embedded within said medium, said light sources being arranged within in said medium in a matrix formal;
   a plurality of light reflecting particles embedded within said medium for diffusing the light emitted by said illuminating means;
   means for coating at least a portion of one surface of said medium with an aluminized light reflecting material; and,
   a modulated energy source coupled to said illuminat- ing means for varying the light intensity emitted by said illuminating means.

2. The light source of claim 1 wherein said medium is translucent.

3. The light source of claim 1 wherein said medium is transparent.

References Cited

UNITED STATES PATENTS

| | | | |
|---|---|---|---|
| 3,127,112 | 3/1964 | McCammon. | |
| 3,143,300 | 8/1964 | Way | 240—3.1 |
| 3,205,755 | 9/1965 | Sklar | 240—3.1 XR |
| 2,880,536 | 4/1959 | Sullivan | 240—8.16 XR |
| 3,194,953 | 7/1965 | Friedland | 240—8.16 |
| 3,213,751 | 10/1965 | Benjamin | 240—106 XR |
| 3,278,740 | 10/1966 | Madansky | 240—8.16 XR |
| 3,302,012 | 1/1967 | Reppisch | 240—8.16 |

NORTON ANSHER, Primary Examiner

LEO H. McCORMICK, Jr., Assistant Examiner

U.S. Cl. X.R.

240—2, 106